W. STAHL.
DOOR OR VENTILATOR LATCH.
APPLICATION FILED MAY 23, 1919.

1,361,194.

Patented Dec. 7, 1920.

WITNESS:
Rob R Kitchel.

INVENTOR
William Stahl
BY
Augustus B. Stoughton
ATTORNEY.

UNITED STATES PATENT OFFICE.

WILLIAM STAHL, OF PHILADELPHIA, PENNSYLVANIA.

DOOR OR VENTILATOR LATCH.

1,361,194. Specification of Letters Patent. Patented Dec. 7, 1920.

Application filed May 23, 1919. Serial No. 299,317.

*To all whom it may concern:*

Be it known that I, WILLIAM STAHL, a citizen of Germany, having declared his intention to become a citizen of the United States, residing at Philadelphia, in the county of Philadelphia and State of Pennsylvania, have invented certain new and useful Improvements in Door or Ventilator Latches, of which the following is a specification.

The principal object of the present invention is to provide simple, efficient, reliable, inexpensive and compact mechanism for closing and bolting, and for unbolting and opening a door transom or like hinged structure by the repetition of a unidirectional movement of the hand or other actuating means.

The invention will be claimed at the end hereof but will be first described in connection with the embodiment of it selected from other embodiments for illustration in the accompanying drawings forming part hereof and in which—

Figure 3:
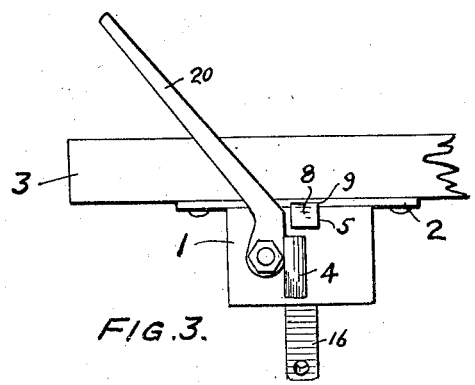
Fig. 3, is a top or plan view drawn to an enlarged scale and illustrating mechanism embodying the invention.
Figure 6:
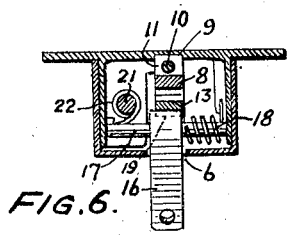
Fig. 6, is a section on the line 6—6, of Fig. 5.
Figure 4:
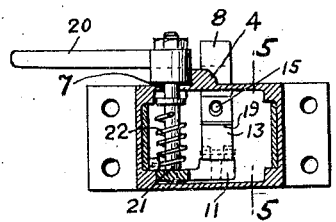
Fig. 4, is a vertical section of Fig. 3.
Figure 5:
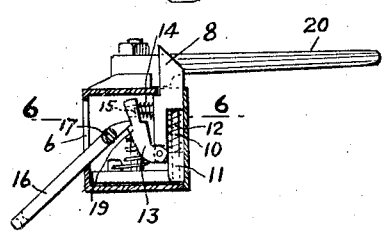
Fig. 5, is a section on the line 5—5, of Fig. 4.

In the drawings 1, is a housing or casing flanged as at 2, for attachment to a hinged transom 3, or like hinged structure. The casing or housing 1, is provided with a stop 4, and with openings 5, 6 and 7, for purposes to be presently described. 8, is a bolt working through the opening 7, and guided in ways 9, and by a stem 10, working in guide 11. 12, is a spring tending to project the bolt 8. 13, is a tumbler pivoted to the bolt 8, and biased away from it by a spring 14, encircling a pin 15, which acts as a guide for the free end of the tumbler. 16, is a lever projecting through the opening 6, and pivoted intermediate of its length as at 17. 18, is a spring biasing the lever into the position shown in Fig. 5. The inner end of the lever 16, coöperates with a shoulder 19, on the tumbler 13, to retract the bolt 8, and to then clear the shoulder 19, and permit the bolt to be projected by its spring 12. 20, is a finger mounted on a shaft 21, working through the opening 7, and biased by a spring 22, into the position shown in Fig. 3.

Figure 1:
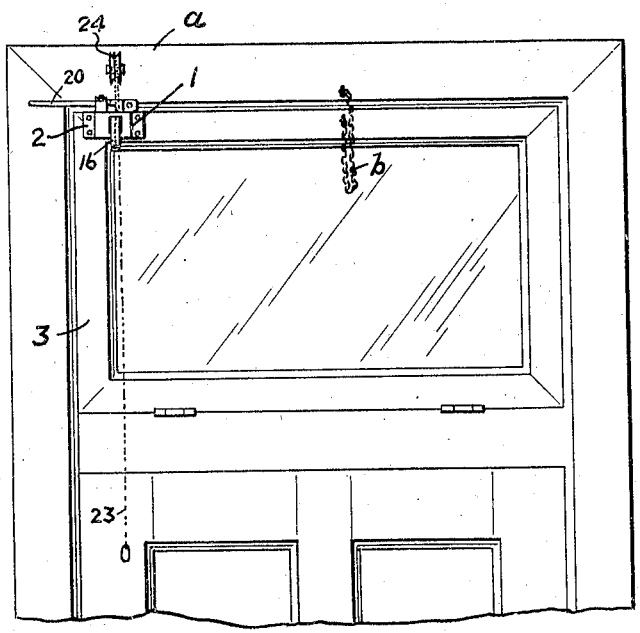
Figure 1, is a face view of mechanism embodying features of the invention in application to a transom.
Figure 2:
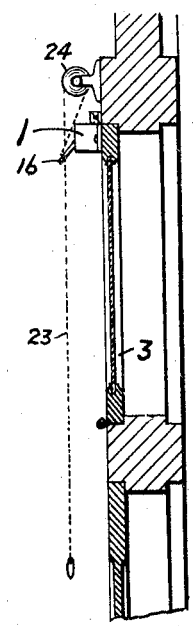
Fig. 2, is a transverse sectional view of the same.

In use the housing or casing 1, is secured to a door, transom or the like 3, in such position that the finger 20, acted on by its spring 21, tends to operate on the jamb *a*, and open the transom, but the spring bolt 8, in engagement with a suitable keeper holds the transom closed. The lever 16, is operated by a hand connection of which the chain 23, passing over the pulley 24, on the jamb *a*, is an example. The parts being in the positions shown in Figs. 1 and 2, the chain 23, is pulled with the result that the longer end of the lever 16, is turned up, this causes the shorter end of the lever 16, acting on the shoulder 19, of the tumbler 18, to depress the latter and the bolt 8, thus releasing the transom which is thrown open to the limit of its stop *b*, by the finger 20. As the lever 16, reaches the end of its upstroke, its shorter end, traveling in the arc of a circle clears the shoulder 19, and the bolt 8, and tumbler return to their initial positions with the bolt projected. To close the transom the chain 23, is again pulled with the result that the lever 16, is turned up to the limit of its stroke, releasing the bolt 8, and serving as a means upon which to pull to shut the transom, which in closing swings the finger 20, from its stop 4, and permits the bolt 8, to enter its keeper. Then when the chain is released the shorter end of the lever 16, rises onto the shoulder 19, ready for a repetition of the described operations.

I claim:

1. In a door or ventilator latch the combination of a spring projected bolt, a shouldered tumbler pivotally mounted on and solely carried by the bolt with which it is bodily movable, and an operating lever having a fixed pivot point and of which one end coöperates with and trips the shouldered tumbler to shift and release the latch, substantially as described.

2. In a door or ventilator latch the combination of a spring projected bolt, a shouldered tumbler pivotally mounted on and carried solely by the bolt, a guide pin and spring interposed between the bolt and tumbler and bodily movable therewith, and a spring pressed operating lever having a fixed pivot point and coöperating with the shouldered tumbler to engage and to clear the same, substantially as described.

WILLIAM STAHL.